Figure 1:
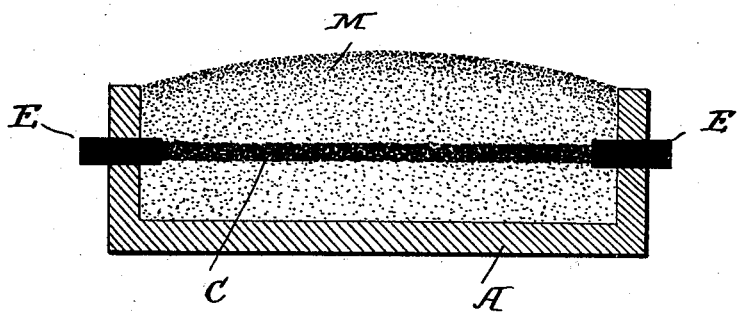

No. 722,792. PATENTED MAR. 17, 1903.
E. G. ACHESON.
METHOD OF PRODUCING COMPOUNDS CONTAINING SILICON, OXYGEN, AND CARBON.
APPLICATION FILED NOV. 20, 1902.
NO MODEL.

Witnesses
Inventor
Edward G. Acheson
By
Attorneys

UNITED STATES PATENT OFFICE.

EDWARD GOODRICH ACHESON, OF STAMFORD TOWNSHIP, CANADA, ASSIGNOR TO THE ACHESON COMPANY, OF NIAGARA FALLS, NEW YORK, A CORPORATION OF NEW JERSEY.

METHOD OF PRODUCING COMPOUNDS CONTAINING SILICON, OXYGEN, AND CARBON.

SPECIFICATION forming part of Letters Patent No. 722,792, dated March 17, 1903.

Application filed November 20, 1902. Serial No. 132,095. (No specimens.)

*To all whom it may concern:*

Be it known that I, EDWARD GOODRICH ACHESON, a citizen of the United States, residing in Stamford township, in the county of Wellington, Province of Ontario, Canada, have invented certain new and useful Improvements in Methods of Producing Compounds Containing Silicon, Oxygen, and Carbon, of which the following is a specification.

The object of my invention is the production of compounds containing silicon, oxygen, and carbon in chemical combination, as hereinafter more particularly set forth; and my invention consists in the various processes and methods hereinafter set forth whereby carbonaceous and silicious materials are treated and silicon-oxygen-carbon compounds are produced which have the general characteristics described, and which products I designate under the general term "siloxicon."

The primary object of my invention is to produce compounds which have certain properties that render them useful for lining furnaces and as material of which to make crucibles, twyers, bricks, muffles, and other articles to be subjected to high temperatures, and while I have herein described in a general way a method whereby they are produced it is to be understood that I do not limit myself to any of the particulars set forth, as they may be varied without departing from my invention.

I have discovered that by heating carbon and silica or material containing these substances compounds containing silicon, oxygen, and carbon in chemical combination are produced which are practical substitutes for refractory clays, magnesia, lime, and graphite in their application to high temperatures and which present additional advantages, as hereinafter more fully stated.

In carrying out my invention I prefer to use an electrically-heated furnace of the general form described in my application Serial No. 124,991, wherein a plurality of zones of maximum and minimum temperatures are employed, although it will be evident that other forms of furnaces may be used without departing from my invention.

Carbid of silicon is made from carbon and silica mixed together in such proportions that the carbon present will be sufficient to reduce the silica and form a carbid with the freed silicon, and in practice there is a small excess of carbon present, this excess materially assisting in the reactions. I have discovered that when the amount of carbon present in the mixture is insufficient for the reduction of the silica and conversion of all the contained silicon into carbid the reduction of the silica is incomplete and a certain amount of oxygen is retained in chemical combination with the silicon, and compounds containing silicon, oxygen, and oxygen are formed. Thus I have made in this way a compound corresponding approximately to the composition $Si_2C_3O$, which has been described by Colson as resulting from an oxidation of the compound $Si_4C_4S$ or from heating silicon in carbonic-acid gas. (C. R. 1882, 94, page 1526.) I have also made analogous compounds wherein the silicon and carbon are in atomic proportions, but wherein their ratio to the oxygen varies within considerable limits. For instance, I have produced a compound $Si_7C_7O$. I have further discovered that the successful manufacture of these compounds requires that the temperature of the furnace be kept below that of the formation of carborundum, as at or about that temperature decomposition occurs, possibly in accordance with this equation:

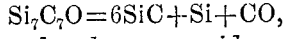
$$Si_7C_7O = 6SiC + Si + CO,$$

the silicon and carbon monoxid escaping from the furnace as vapor and gas, while the carbid of silicon remains in the furnace as carborundum-crystals. The proportions of carbon and silica in the charge may be varied. I find, for instance, that a considerable excess of carbon may be employed and that under suitable temperature conditions compounds of the character above indicated are formed, the excess of carbon remaining in the charge in a free state.

Figure 2:
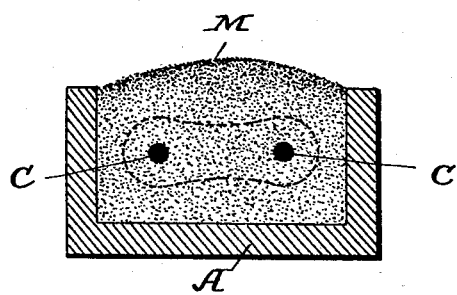

In the accompanying drawings, Figure 1 is a longitudinal section of a furnace which may be used in carrying out my method, and Fig. 2 is a transverse section of the same.

In carrying out my invention silica and carbon may be mixed together in suitable proportions, or carbonaceous and silicious materials, such as ordinary coke and carbonaceous shale, may be mixed in such proportion as to give the proper carbon and silicon content, or a carbonaceous shale containing the required amount of carbon and silicon may be used without addition. Thus if ground coke and sand be mixed together in such proportions that the silica content shall be to the carbon content as two is to one and this mixture be placed in a suitable furnace and heated to and maintained at a definite high degree of temperature a reaction between the carbon and silica will occur, carbon monoxid gas will be given off, and a compound containing silicon, oxygen, and carbon will remain in the furnace, which may be removed and used for many purposes—as, for instance, a refractory furnace-lining for the making of crucibles, twyers, bricks, muffles, &c. The temperature at which the reaction occurs has yet to be determined, but is lower than that at which carbid of silicon is formed.

As one example of my method I take of powdered carbon thirty-three and one-third per cent. and of powdered silica sixty-six and two-thirds per cent. and mix them thoroughly together. When the mixed materials are fine-grained, I add a little sawdust to increase the porosity, modifying the above mixture in view of the silica and carbon content of the sawdust. It will be understood that the silica content of the carbon is also considered in the preparation of the charge. The mixture is now charged into an electric furnace—for instance, the one illustrated in the accompanying drawings, where A represents the furnace-body, which may consist of bricks or other suitable material; E E, the electrodes passing through the end walls of the furnace; M, the mixture of carbon and silica, and C C two conducting-cores, which are preferably made of granular carbon, placed in position when the mixture is being placed in the furnace. Carbon-rods or resistances of other form may be substituted for the granular cores.

With a furnace of the form shown, measuring fifty-six inches in length, twenty inches in width, and fourteen inches in depth, inside measurements, filled with the described mixture and containing two cores of granular coke three inches in diameter and forty-eight inches in length, the current was started with eighty-five volts and five hundred amperes. The volts remained practically constant, the amperes soon increasing to six hundred, after which they remained practically constant to the end of the operation. The operation lasted nine hours. After cooling and opening the furnace all of that part of the charge occupying the space between and for a certain distance around the cores, as indicated by the dotted lines shown in Fig. 2, was found to be converted into loose granular or pulverulent amorphous material that was gray-green when cold and light-yellow when heated to about 300° Fahrenheit or over. An analysis of the material gave the following composition, by weight: Si, 57.7; C, 25.9; iron, 2.1; aluminium, 0.4; calcium, trace; magnesium, trace; O, (by difference,) 13.9. Further tests showed the material to be very refractory, neutral in its behavior with both acid and basic slags, insoluble in molten iron, to have a specific gravity of 2.73, to be indifferent to all acids except hydrofluoric, which attacked it slowly, to resist the action of hot alkaline solutions, and when ground, moistened with water, molded into form, and fired to yield a coherent mass.

What I claim is—

The herein-described method which consists in heating a suitable mixture containing carbon and silica under the conditions substantially as described to form a product consisting essentially of silicon, oxygen and carbon in chemical combination.

In testimony whereof I have signed my name to this specification in the presence of two subscribing witnesses.

EDWARD GOODRICH ACHESON.

Witnesses:
F. L. FREEMAN,
W. CLARENCE DUVALL.